United States Patent [19]

Hokynar

[11] Patent Number: 4,951,224
[45] Date of Patent: Aug. 21, 1990

[54] CONTROL DEVICE FOR FLUID FLOW

[76] Inventor: Jiri Hokynar, Fraunhoferstasse 11, 8033 Martinsried, Fed. Rep. of Germany

[21] Appl. No.: 224,338

[22] Filed: Jul. 26, 1988

[30] Foreign Application Priority Data

Jul. 30, 1987 [DE] Fed. Rep. of Germany ....... 3725312

[51] Int. Cl.⁵ .......................... G01F 1/00; G06F 15/20
[52] U.S. Cl. ................................ 364/510; 364/571.01; 73/861.02; 73/195; 340/606
[58] Field of Search .................... 364/509, 510, 571.01, 364/148; 340/603, 606; 73/861.01, 861.02, 861.08, 195, 204

[56] References Cited

U.S. PATENT DOCUMENTS

| 4,217,647 | 8/1980 | Sjöholm et al. | 364/510 |
| 4,325,127 | 4/1982 | Major | 364/510 |
| 4,364,111 | 12/1982 | Jocz | 364/510 |
| 4,507,974 | 4/1985 | Yelderman | 364/510 |
| 4,581,707 | 4/1986 | Millar | 364/510 |
| 4,590,576 | 5/1986 | Elpiner | 364/510 |
| 4,651,286 | 3/1987 | Fukai et al. | 364/510 |
| 4,679,151 | 7/1987 | Morris et al. | 364/510 |
| 4,725,964 | 2/1988 | Lloyd et al. | 364/510 |

Primary Examiner—Parshotam S. Lall
Assistant Examiner—Brian M. Mattson
Attorney, Agent, or Firm—Arnold, White & Durkee

[57] ABSTRACT

An apparatus for controlling the fluid flow rate through a fluid transmission conduit is disclosed. A first set of resistors and a second set of resistors are connected in full bridge fashion and placed in contact with a separate measurement conduit in fluid communication with the fluid transmission conduit. A signal from the measurement conduit proportional to the fluid flow rate therein is sent to a computer. The computer is operative to actuate a control valve in response to the signal. The control valve is disposed upstream from the measurement conduit inlet in the fluid transmission conduit. The computer is also enabled to perform an autocalibration routine of the flow control apparatus that a yields a control accuracy of better than 1 percent.

9 Claims, 2 Drawing Sheets

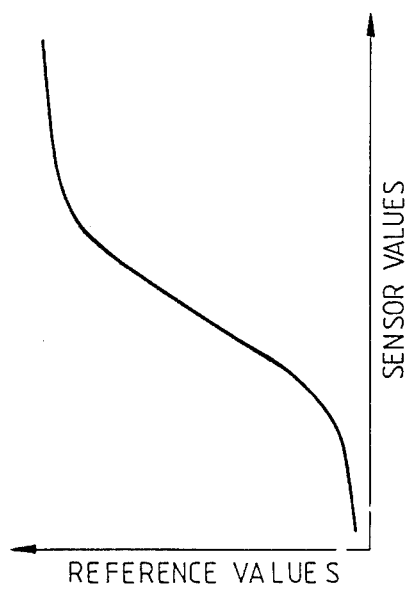
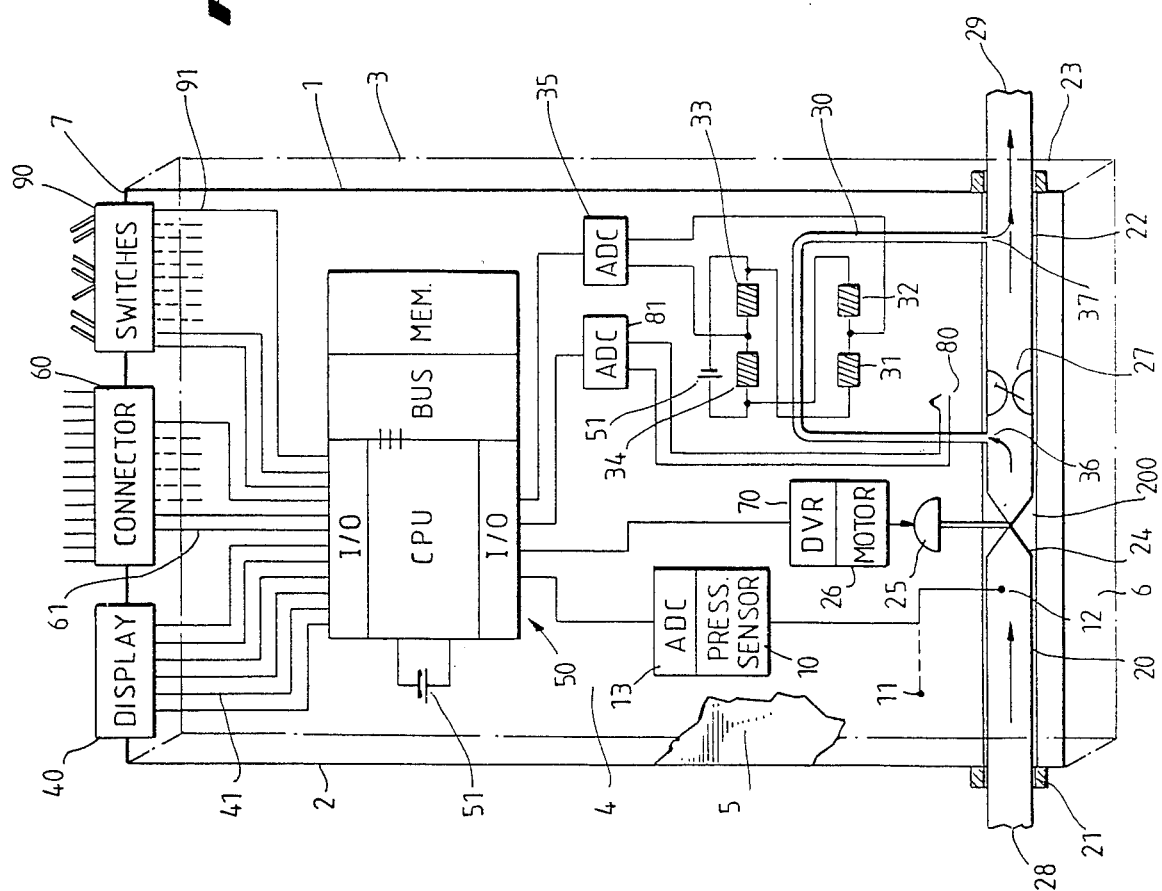

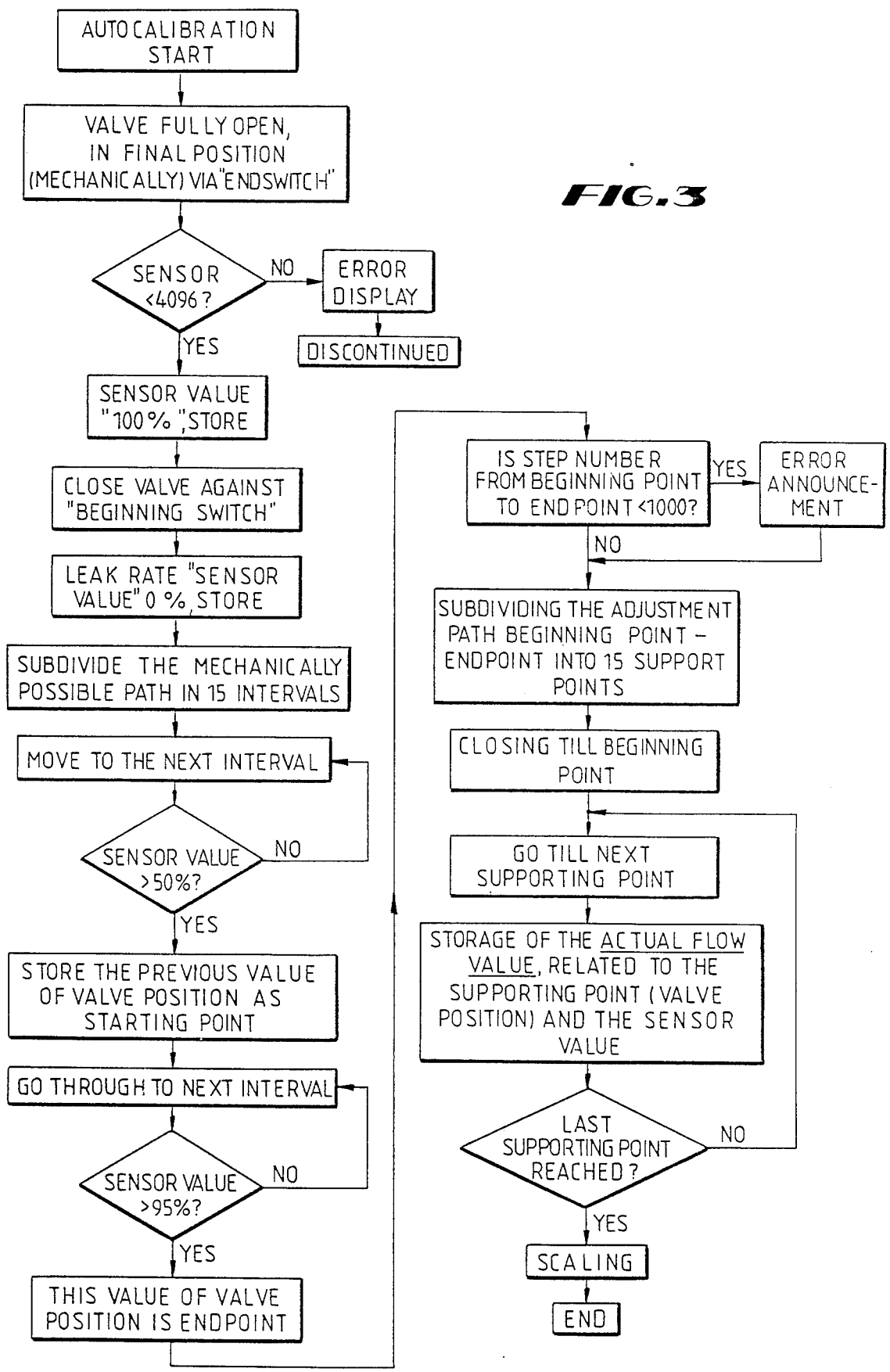

CONTROL DEVICE FOR FLUID FLOW

BACKGROUND OF THE INVENTION

1. Field of the Invention

The present invention relates to a control device. In particular, the invention relates to a gas flow control device.

2. Description of the Prior Art

In many chemical and physical processes, the flow of a fluid in particular a gas must be controlled and held constant over a given time. Often the requirement is to control or regulate the flow of a fluid, for example a gas, so that a constant mass of the fluid or gas per unit time flows to a user. Devices have been developed with a valve in a gas line regulated by measurement of the gas flow so that the gas flow has a desired value. Such devices require cable connections from the valve control unit, for example to a computer and back. In addition, the devices must be individually calibrated in a complicated way. A control accuracy of better than 1 percent is hardly achieved.

SUMMARY OF THE INVENTION

The object of the invention is to provide a control device for fluid flow that avoids the mentioned disadvantages. In particular, with the device in accordance with the invention, the measurement or determination of the valve setting is to be eliminated and the device should have a control accuracy of 1 percent or better.

The object is achieved by a device as defined in the claims. Preferred embodiments are defined in the dependent claims and result from the following detailed description as well as the drawings.

BRIEF DESCRIPTION OF THE DRAWINGS

FIG. 1 shows a schematic sectional view through the device according to the invention, FIG. 2 a valve characteristic and FIG. 3 a logic flow diagram for autocalibration.

DESCRIPTION OF THE PREFERRED EMBODIMENTS

The device of the invention for controlling fluid flow, in particular gas flow, is a compact device, all units including the computer control are located within the housing (1). The housing is preferably formed as a rectangular block (2, 3, 4, 5, 6 and 7) and consists in particular of sheet metal, for example steel sheet.

An inlet (20) in one wall (2) of the housing (1) leads to an inlet channel (28). An outlet channel (29) is led to an outlet (22) preferably on the opposite wall (3) of the housing. The inlet channel, the outlet channel and the space between the two channels for mounting the valve are preferably formed as a basis block (200) (for example metal block or synthetic block).

It is preferred that the inlet and outlet are near the bottom (6) of the device on the left (2) and the right side (3) of the device, respectively. Joining elements (21 or 23), for example screw connectors, are provided for connecting a fluid source to the inlet channel (28) and correspondingly for connecting a fluid user to the outlet channel (29). Instead of screw connectors, other connectors for example flange pairs with swivel nuts could also be provide. In any case, the connection elements are so formed that fluid loss, in particular gas loss at these connections is avoided as far as possible.

Between the inlet channel (28) and the outlet channel (29), a control valve (24) is mounted within the housing (1). This control valve (24) comprises a mechanical flow limit means (25) and an actuating element (26) and is provided for setting the flow limit means. This control valve (24) is preferably a valve that is not influenced by the inlet pressure of the fluid medium in the inlet channel (28) for its actuation. The actuating element (26) for setting the valve or respectively the flow limit means (25) is preferably an electric step motor (26). It can for example govern the valve between the two stops of the flow limit means over a number of for example 5,000 to 50,000 steps.

The control of the step motor (26) is made with a microcomputer (50). The power supply (51), preferably a battery with an extended lifetime, is also located inside the housing (1). The control is based on data stored in the memory unit MEM of the computer and that partially inputted from the outside and data generated partially by a measurement within the housing (1). This will be discussed in detail below.

The measurement of the actual fluid flow through the outlet channel (29) is made in a measuring line (30) connected in parallel to a section of the outlet channel (29). Inside the housing (1) but outside the measuring channel preferably four resistors (31, 33 and 32, 34) on the respective ends of the measuring line path (36, 37) are associated with the measuring line (30). The heating of the resistors (31, 33, 32, 34) and their resistance value depends on the amount of fluid or gas flowing through the measuring line path (30). Therefore, the ratio of the resistances can be used as a value proportional to the mass flow for regulation and calibration.

The four resistors (31, 33 and 32, 34) are connected preferably as a full bridge circuit with a power supply (51), which can be the same power supply for operating the microcomputer (50), but need not be. The diagonal voltage is proportional to the ratio of the resistance values of the resistors (31, 33 and 32, 34). This voltage is fed to the input/output unit of the microcomputer (50) for further processing via analog-to-digital converter (ADC) (35).

The inlet channel (28) and the outlet channel (29) can also be made of common piping material, in particular stainless steel instead of being formed as a basis block (200). If the device is to be used for special, for example corrosive gases, appropriate chemical-resistant piping material is employed. The measuring pipeline (30) also consists of an appropriate chemically resistive material, for example stainless steel.

To realize a precise control or regulation of the gas flow, a temperature sensor (80) is preferably provided in the isothermic region of the measurement path, near the measuring line (30). With an ADC (81) a digital signal corresponding to a temperature deviation from the set temperature is supplied to the input/output unit of the computer. A temperature compensation takes place preferably automatically based on values specific to the device and stored in the computer. These values for the correction are obtained by placing the invention in a climatic test chamber at least at two different temperatures (e.g. 20° C. and 40° C.) and the corresponding measurement values (drift widths on the bridge caused for example by asymmetry, thermal stress, temperature dependent changes in the analog parts of the electronics) are taken at these two temperatures and the corresponding first numbers are stored; the temperature signals generated by the temperature sensor for the corresponding temperatures are also detected and at the same time stored in a table as the second numbers associated with these temperatures. In operation then, a correction occurs automatically with the computer based on the second number value calculated for the present temperature signal; in the simplest case, the computation is made through linear interpolation of the table values.

A further improvement in the utility and the measurement accuracy of the invention can be achieved when a pressure sensor (10) is provided inside of the housing (1). This pressure sensor (10) can measure the atmospheric pressure in the housing (1) at the position (11) or it can measure the pressure in the inlet channel (28) at the position (12). The measured pressure value can then be transformed into a digital signal in an ADC (13) which is supplied to the computer through the I/O unit.

For pressure compensation, a table is also preferably entered (stored) in the computer according to the invention, which contains at least two first (pressure) number values associated with the pressure sensor measurement values and two second (flow) number values belonging to these associated with the corresponding measurement values of the sensor. These first and second number values are generated in a similar manner as in temperature compensation. For example, the sensor values are detected and corresponding second (flow) number values stored, which result at the same valve position and different pressure differentials over the device. This pressure compensation table in the computer allows a preventive, rapid regulation of pressure differential changes and one must not await the response of the sensor. A display unit (40) and a multipole connector (60) is mounted on the wall of the housing (1) preferably on the side end (7) opposite the bottom of the housing (1). In a preferred embodiment, a multiple switch means (90) is also mounted on the wall of the housing (1). The display (40) is preferably an LED display. Another example for such a display is a liquid crystal display. The display unit (40) is connected with the input/output unit of the computer (50) with connection lines (41) and displays the relevant values of device operation according to the program stage, i.e. in particular actual flow through the opening (22).

Various data from the outside can be entered into the computer (50) via the multipole connector (60) which is also connected with its connection lines (61) input/output unit of the computer (50). This occurs with a mating connector and usually from another computer, for example a central computer. In this way, the control by the computer (50) can be modified by instructions from a main computer.

The multiple switch (90) is also connected with its connection lines (91) to the input/output unit of the computer (50). This multiple switch (90) makes possible, for example different displays (degrees Celsius or degrees Fahrenheit, different flow units, etc.) or to implement different control programs or to adjust the device for different gases. It is also possible with the multiple switch (90) to determine the set point for the fluid flow, e.g. the gas flow in the line (22) to the user. according to the invention, an accuracy in controlling the gas flow to the outlet (22) is achieved which is better than 1 percent. In addition it is possible to calibrate the invention, namely with a further such device. The computer (50) is programmed for the calibration phase so that the entire mechanical path of the valve (24) is travelled where with the fluid source being connected, the change of the resistance ratios of the resistors (32, 34 and 31, 33) are measured, stored and then it is checked whether a sufficient minimal number, for example 9,600, of steppings of the step motor (26) lie between the flow values of 5 percent and 95 percent. Typically, depending on the requirements, this minimal number of steps in the control range will lie between 500 and 50,000. If the number of steps is too small, the computer gives a display that the device is in error.

When the number of steps is larger than the minimum, the control range is then set in the memory of the computer (50). This also determines what number of steps is required by the step motor (26) to cause a certain flow change.

The preferred autocalibration of the device occurs in detail as follows.

The sensor for measuring the gas flow-through does not deliver an absolute signal corresponding to the flow rate, but a relative value depending on the measurement line and sensor. This relative signal must be associated with the actual flow value.

This association of the flow rate values, also called reference values takes place during autocalibration. At discreet valve positions, which are automatically set in sequence, the corresponding flow value is associated with the sensor signal. Intermediate values can then be interpolated with sufficient accuracy. The reference values must be inputted from a standard device or via remote control.

The result of autocalibration is thus a characteristic (see FIG. 2), where the sensor values are plotted on one axis and the reference or flow rate values on the other. The flow values and the sensor values are stored in the memory of the control computer.

In calculating the flows with this characteristic, the valve and sensor non-linearities as well as offsets in the measurement circuitry are automatically included.

The possible mechanical settings of the valve are much larger than the effective settings in which the gas flow is actually influenced. This depends on the pressure and the type of gas.

Outside of the effective region, a control is useless, since the gas flow cannot be influenced. The effective setting range is defined as the range between 5 and 95% of the maximal flow-through. The first task of the autocalibration is then to determine this effective setting or adjustment range. For this, the valve is open (100) and the measurement value read in (110) (see FIG. 3). Then the valve closes (120), and the value of the leakage flow is determined from the difference between measurement (open) and measurement (closed), the lower limit with 5% and the upper limit with 95% is automatically calculated (130).

Now the adjustment range is automatically passed starting from the closed valve position. At equidistant positions, the measured value is first compared with the measurement (closed) and then with the measurement (open). Thus the limits of the effective adjustment range are automatically determined.

The difference between the limit positions is divided by 15 (140). With the result, the positions of 16 interval points can be calculated. The allocation or association of measurement value to reference value is then made at these points.

When the positions of the 16 interval points are known, the valve preferably closes and then travels to the first interval point (150).

The previous closing eliminates the effect of gear play. At the first interval point the measurement value is then automatically read-in and subsequently the reference value is called. Now the actual gas flow must be measured with an apparatus. This is inputted on the terminal (160). The measurement of the first interval point is completed. The remaining follow in the same manner (170).

When all interval points are measured, the valve closes to avoid unnecessary gas consumption. Scaling of the inputted values follows for the internal numerical representation (180). This normalization is preferably made so that 100% flow corresponds to the internal number value 4096. The program thus calls the number value which corresponds to 100%. After the input, the reference values are scaled and the status of the calibration data is set to valid. Then, the 100% values of all further non-transformable dimensions are called. This to allow the conversion of the internal representation to dimensioned outputs and vice versa. If no 100% value is entered for a certain dimension but only a carriage return, no input and output can occur in this dimension during control operation. Then a 0 appears in the display.

When all of the 100% values are specified, the autocalibration is completed.

The type of gas and dimension must be selected before starting the autocalibration. A change during the procedure has no effect.

It is to be noted that constant pressure conditions exist in the device. If calibration is done with a standard, this must be connected into the gas flow upstream of the device to be calibrated. A calibration with a standard can achieve an accuracy of 1 percent.

The sensor signal is proportional to the mass of the gas flowing through the measurement line. At constant flow-through, the sensor voltage changes with the gas, i.e. the characteristic has a different slope for each gas. To guarantee a certain accuracy, it is preferred to match the sensor signal to the input voltage range of the analog/digital converter (ADC). Should the maximum flow rate for example be 1.2 l/min. the measurement line is adjusted so that the maximal input voltage is present on the ADC at this flow rate.

This adjustment is different for each gas. Therefore through autocalibration, the device is optimally adjusted only for one gas, the main gas. The remaining three possible gases are mismatched according to the ratio of their atomic numbers to the main gas.

If the secondary gas has a smaller atomic number than the main gas, less heat is dissipated, and the sensor voltage becomes smaller at the same flow rate. This can have the effect that the difference in the digitized sensor voltages, between maximum and minimum flow, is less than 1000 increments. In this case the specified accuracy is no longer guaranteed.

On the other hand when the secondary gas has a larger mass than the main gas, more heat is dissipated. The sensor voltage increases at the same flow rate. The input voltage range of the ADC is completely used but the adjustment of the valve between the minimum and maximum measurable flow rate is too small. The resolution of the actuator is not high enough.

The device detects such errors during the autocalibration procedure. It is not stopped, however, a later control operation with this gas is only possible with a correspondingly reduced accuracy.

The adjustment of the measurement line/sensor relationship to a certain type of gas is made by the manufacturer. The reference values must be inputted in the predetermined dimension. Valid values in the dimensions l/min, ccm/min and mol/h are in the numerical range of 0.001 to 999.999.

The reference values as integers lie preferably in the numerical range from 0 to 32000.

It is important that the interrelationship between the reference values corresponds to that of the flow rates. The absolute values are not important, they must only be within the allowed numerical range. The absolute reference is then established by the 100% value inputted. Errors can occur during calibration. They lead to interruption or display of a certain condition depending on how severe they are.

A mismatch of the measurement line/sensor relationship or vacuum or over pressure lead to a mismatch at the input voltage range of the ADC. If the voltage at maximal flow is over 5V the error message E7 results. The calibration however is continued.

To guarantee the control accuracy of 1 percent, the digitalized input voltage difference between upper and lower range limits must be larger than 1000 increments. If this is not the case the error message E5 results. The calibration however is continued.

Also the setting range between the range limits must be larger than 1000 steps. If this is not the case the error message E4 occurs. The calibration however is continued.

If no gas flow is present the error message E3 occurs. The calibration is interrupted.

The given 100% value is too small. The scaled reference values exceed the internal representation range. The error message E6 follows.

All errors arising are displayed at the end of calibration in the device display cyclically. They can only be eliminated with instruction 10, interruption of autocalibration. After interruption, the errors are no longer displayed.

The errors E3 and E6 lead to calibration interruption. No valid data are accepted. After eliminating the error display in the device display, the error E8 is shown in the status line. Set point, actual value and the alarm values are then 0. Control is not possible.

In summary, the autocalibration of the device is as follows:

(1) Automatic determination of the effective setting range by
  (a) passing through the mechanically possible setting range thereby determining the leakage flow and the full flow,
  (b) determining the start and end-point of the effective setting range due to predetermined minimal (for example 5%) and maximal (for example 95%) flow values, where the percentages refer as 100% to the difference between full flow (valve completely open) and the leakage flow (valve completely closed).
(2) Automatic division of the effective setting range into a number of interval points, preferable 5–50 of such points in particular about 15 interval points,
(3) travelling to the interval points of the effective setting range preferably starting from the closed valve position and determining the sensor value (preferably digitally) of the device and the actual gas flow (also preferably digitally and with a calibration device, possibly the same structure as the device being calibrated),
(4) storing the value pairs in the internal memory of the device, possibly after normalization (for example in that 100% corresponds to the number 4096=hexadecimal 1000).

The autocalibration takes place automatically. In operation of the device, the detection of the valve adjustment is unimportant, is however preferably also detected and stored for example in the form of the number of steps of a step motor to a certain interval point; a presetting then occurs preferably and rapidly by the valve adjustment. The automatic control or fine control of the gas flow results due to the regulation of the valve adjustment to the particular sensor value. The valve positions of the effective setting range (also preferably digital values) for the start and end positions of the control range of a step motor are stored. The autocalibration as a logical flow diagram is illustrated in FIG. 3.

In the preferred embodiment, a valve (24) is employed which remains still if the control fails and does not automatically close. An independently acting safety valve can also be provided in the line to the user or also inside of the housing (1). This type of valve has the advantage that when the control is defective, a continuation of operation maintaining the previous flow remains possible (when the fluid source is unchanged).

A further advantage of the device according to the invention is the exceptionally high calibration speed. The calibrated device according to the invention can calibrate an additional such device in less than one hour and this at a measurement and control accuracy of 1 percent or better.

I claim:

1. A fluid flow control apparatus comprising:
    a housing;
    an inlet leading into the housing and a connecting inlet channel;
    a first line connector mounted at the inlet for connecting a fluid source;
    an outlet leading from the housing with an outlet channel connected thereto;
    a second line connector mounted at the outlet for connecting a fluid user;
    a control valve mounted in the housing between inlet channel and outlet channel with a mechanical flow limit means and an actuator element for actuating said flow limit means;
    a microcomputer mounted inside the housing with:
        a central processing unit (CPU),
        a data bus (BUS),
        data memory (MEM),
        input/output units for processing data for the central processing unit and for converting data from the central processing unit into signals for peripheral units, the central processing unit (CPU) being connected with the data bus (BUS), and the data bus (BUS) being connected with the data memory (MEM),
    a measurement line connected parallel to a section of the outlet channel being disposed inside of the housing;
    a first resistor set being disposed within the housing contacting the measurement line adjacent the measuring line inlet;
    a second resistor set being disposed within the housing contacting the measurement line adjacent the measuring line outlet, the first and the second resistor sets being connected with one another in a compensation circuit having an output, the output of said compensation circuit being dependent upon the said resistor, sets;
    an analog-to-digital converter being connected to the output of the compensation circuit and having an output, the output of said converter connected to the microcomputer;
    an optical display unit mounted on the housing, the optical display unit being readable from outside the housing, the optical display unit being electrically connected to the microcomputer;
    a multipole connector mounted on the housing, a mating connector being connectable to same from outside the housing, the multipole connector being electrically connected to the microcomputer;
    a stepping circuit driver being disposed within the housing and having an input and an output, the input of the stepping circuit driver being connected with the microcomputer, the output of the stepping circuit driver being connected with the actuator element such that the signals supplied by the microcomputer actuate the flow limit means through the actuator element.

2. The apparatus in accordance with claim 1 further comprising:
    a temperature sensor mounted within the housing adjacent the first resistor set and the second resistor set of the measurement line, said sensor being in thermal contact with the measurement line;
    an analog-to-digital converter having an input which is connected with the temperature sensor and having an output which is connected with the microcomputer.

3. The apparatus in accordance with claim 1 further comprising:
    an inset means being disposed in the outlet channel and being replaceable through an opening in the housing, said replaceable inset means being disposed in the flow direction after the flow limit means and between the measurement line inlet and measurement line outlet.

4. The apparatus in accordance with claim 1 further comprising:
    a multiple switch mounted on the housing having connector lines connected with the microcomputer, said multipole connector, said display unit and said multiple switch being mounted substantially adjacent each other on the housing.

5. The apparatus in accordance with claim 1, wherein:
    the housing is a rectangular block having a bottom side and a top side opposed thereto, the inlet and the outlet being located int he left and right side wall, respectively, of the housing near its bottom side, and said multipole connector, said display unit and said multipole switch being located on the top side of the housing.

6. The apparatus in accordance with claim 1, wherein:
    the measurement line has an access opening reachable through an opening in the housing, said access opening allowing access inside the measurement line, said access opening of the measurement line being fluid tightly sealed during operation.

7. The apparatus in accordance with claim 1, wherein:
    the inlet channel, the outlet channel and the control valve are formed as a basis block.

8. The apparatus in accordance with claim 1 wherein:
    the first resistor set is two resistors contacting the measurement line adjacent the measurement line inlet and the second resistor set is two resistors contacting the measurement line adjacent the measuring line outlet, said resistors being connected as a full bridge circuit compensating errors caused by asymmetry.

9. A fluid flow control apparatus comprising:

a housing;

an inlet and a connecting inlet channel;

a first line connector mounted at the inlet for connecting a fluid source;

an outlet and a connecting outlet channel;

a second line connector mounted at the outlet for connecting to a fluid user;

a control valve mounted int eh housing between the inlet channel and the outlet channel with a mechanical flow limit means and an actuator element for actuating said flow limit means, the mechanical flow limit means having a mechanically possible setting range;

a measurement means for generating a signal uniquely associated with the gas flow between the inlet and the outlet;

a computer programmed to perform an autocalibration procedure, the computer being connected to the actuator element, the computer being operable to fully open the control valve by signaling the actuator element, the compute being connected tot he measurement means, the computer being operative to store a signal from the measurement means representative of fully open flow, the computer having a data input and being operable to store data representative of actual fluid flow at fully open flow, the computer being operable to fully close the control valve by signalling the actuator element, the computer being operative to store a signal from the measurement means representative of leakage flow, the computer being operable to store data representative of actual leakage flow, the computer being operable to determine an effective setting range of the control valve between five percent and ninety-five percent of the fully open flow value; the computer being operable to store a signal from the measurement means representative of flow at each interval, the computer being operable to store data representative of actual fluid flow at each interval;

the mechanical flow limit means being controlled to travel to a plurality of interval points in this effective setting range by signaling the actuator element;

the measurement means being operative to generate signals representative of gas flow at each of these interval points, sensor values associated with the signals being received through the data input and being automatically stored, values corresponding to the actual gas flow at these interval points being automatically stored, the sensor values corresponding to the signal of the measurement means and the flow values corresponding to actual gas flow are stored so that sensor values may be correlated to actual gas flow values.

* * * * *

UNITED STATES PATENT AND TRADEMARK OFFICE
CERTIFICATE OF CORRECTION

PATENT NO. : 4,951,224

DATED : August 21, 1990

INVENTOR(S) : Jiri Hokynar

It is certified that error appears in the above-identified patent and that said Letters Patent is hereby corrected as shown below:

Column 3, line 46, after "(61)" insert --to the--.

Column 3, line 61, begin a new paragraph and change "according" to "According" to begin the paragraph.

Column 7, line 40 after "connecting," insert --to--.

Column 7, line 55, delete the "," and insert --;-- therefor.

Column 7, line 68, delete the ",".

Column 8, line 50, delete "int he" and insert --in the-- therefor.

Column 9, line 14, delete "int eh" and insert --in the-- therefor.

Column 9, line 27, delete "compute" and insert --computer-- therefor.

Column 9, lines 27-28, delete "tot he" and insert --to the-- therefor.

Signed and Sealed this

Tenth Day of December, 1991

Attest:

HARRY F. MANBECK, JR.

*Attesting Officer*     *Commissioner of Patents and Trademarks*